INVENTOR.
Allen M. Bower,
BY
John O. Leonard
his ATTORNEY.

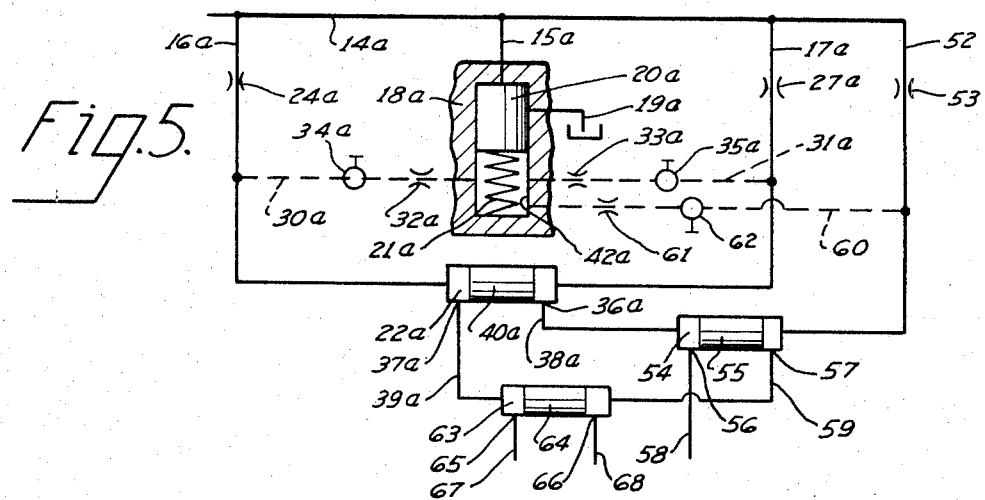
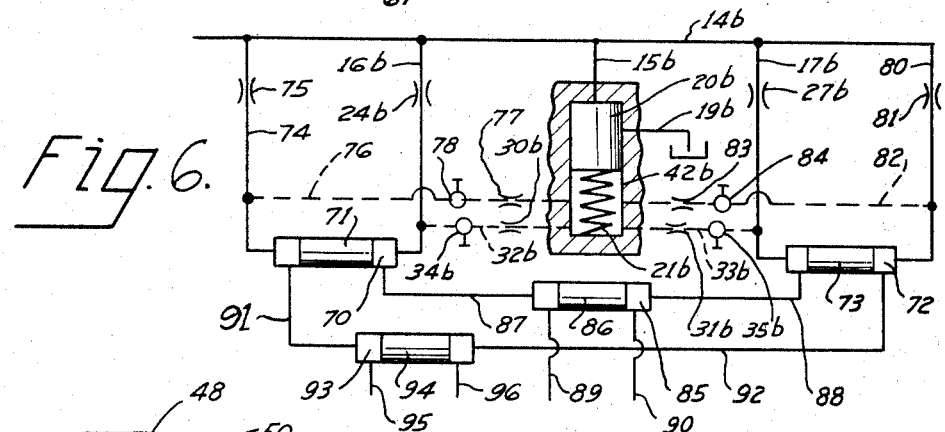
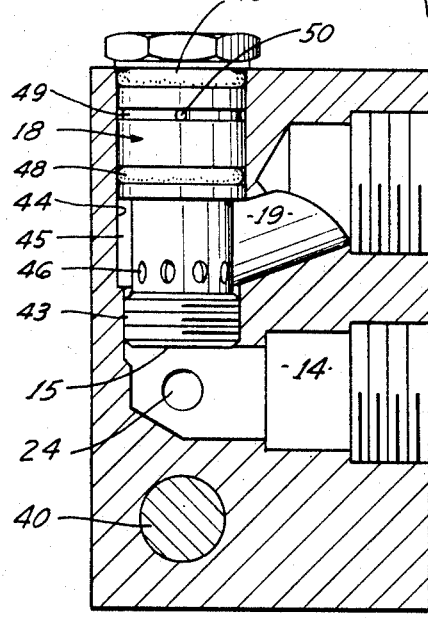

United States Patent Office 3,435,838
Patented Apr. 1, 1969

3,435,838
VALVE FOR CONVERTING SINGLE INPUT FLOW INTO A PLURALITY OF PRESSURE COMPENSATED REGULATED OUTPUT FLOWS
Allen M. Bower, Painesville, Ohio, assignor to Fluid Controls, Inc., Mentor, Ohio, a corporation of Ohio
Filed Aug. 1, 1967, Ser. No. 657,701
Int. Cl. G05d 11/03
U.S. Cl. 137—101
9 Claims

ABSTRACT OF THE DISCLOSURE

The present valve is one which receives a flow of fluid and passes it through a plurality of volume control orifices from which the flow issues as a plurality of streams, each of predetermined flow, which may or may not, as desired, differ in volume and pressure from each other. The streams are delivered to separate outlet ports, one for each orifice. The ports are connectable to external loads, respectively. Each orifice is selected, or adjusted, for a predetermined flow. The valve maintains the same predetermined drop or pressure differential across each orifice so that each predetermined flow is maintained constant regardless of the external load on its associated orifice, so long as the external loads are within the capacity of the fluid supply to the valve.

Within the valve are sensing means which sense changes in the predetermined differential in pressure at their inception and control by-pass means in a relation to the sensed changes so as to restore the predetermined pressure differential to the original value.

Beyond the orifices, in a direction toward the outlet ports, are compensating means subjected to the streams and movable in response to differentials in the pressures thereof so as to control the effective size of their outlet ports in a manner to equalize, at the discharge sides of the orifices, the pressures of the streams at the level imposed by the highest external load.

The valve thereby delivers a plurality of pressure compensated regulated flows each of which may be equal to, or may differ from, the pressure and volume of the others.

---

This invention relates to a pressure compensated regulated flow valve for receiving an input flow of fluid for converting the input flow into a plurality of pressure compensated regulated flow streams which may be equal to, or may differ from, each other in volume and pressure, and for discharging the streams through separate outlet ports for delivery to external loads, respectively.

For purposes of illustration, the valve is described as a dual outlet valve applied to a highway salting truck for supplying fluid at one volume and pressure to a salt feeding auger and at a different volume and pressure to a rotary spreader by which the salt is spread onto the highway pavement.

Heretofore, in prior structures, the auger and spreader have been driven by associated hydraulic motors supplied with fluid by a pump driven, for example, by the truck engine. The fluid is supplied through separate adjustable flow regulators arranged in series with each other, one in advance of each hydraulic motor. Each regulator is pressure compensated and delivers a preselected volume to each motor. The pump supplies to the first regulator more fluid than is required by its associated hyraulic motor. The excess fluid is passed to the input of the second regulator. The prior regulators are preselected so that fluid, adequate in amount and pressure, is supplied to both regulators and the excess, if any, from the second regulator is discharged to a sump or tank.

Individual pressure compensated regulators of this type, however, are very expensive, employing, as they do, a considerable number of parts each of which must be precisely made and fitted.

The present valve is simple in construction. Instead of a plurality of individually expensive and complicated compensated flow regulators with many moving parts, it employs adjustable orifices, pressure sensing means comprising a simple by-pass spool and cylinder assemblage readily insertable as a unit into a bore in the body, a pressure equalizing spool reciprocable in a bore in the body, and a plurality of ducts formed in the body and providing the hydraulic circuit interconnecting the parts hydraulically and leading to individual outlet ports, respectively. Accordingly, the present valve is a simple and compact self-contained unit which is readily installable where required and which can be adapted for a plurality of outlet ports as dictated by the number of external loads to be driven independently of each other.

With the present structure, if either the spreader or the auger is stopped by external forces, the other of the two is stopped immediately. If the flow to the auger or spreader is cut off by regulation of its adjustable orifice, the other one of the two is not affected. If the speed of either the auger or spreader is reduced partially by excessive overload, the sped of the other of the two is proportionally reduced.

If the volume of fluid delivered by the pump becomes inadequate, the flows to both the auger and spreader are reduced in proportion so that the two slow down proportionately.

In the present illustrative valve, the equalizing spool performs a pressure compensating function only, but performs this function for two outlets. The by-pass means performs a by-passing function only, but performs this function for two outlets. The demand at the outlet for the heavier of the work loads determines the normal position of the equalizing spool, the function of which is to maintain equal pressures at the discharge sides of the flow control orifices, regardless of the work load placed on the outlets.

Various specific objects and advantages will become apparent from the following description in which reference is made to the drawings wherein:

FIG. 4 is a vertical cross sectional view taken on the line 4—4 of FIG. 2;

FIG. 5 is a diagrammatic illustration of a modification of the valve for providing three compensated regulated flows; and FIG. 6 is a diagrammatic illustration of another modification of the valve for providing four pressure compensated regulated flows.

While for purposes of illustration, the valve is shown as used in connection with a conventional auger and spreader of a highway salting truck, it will become apparent from the illustrative example that the valve is suitable for the feed and drive for ground augers used for boring holes for telephone poles and for many purposes wherein a plurality of different pressure compensated regulated flows of working or chemical fluids from a single flow source is desirable.

Figure 1:
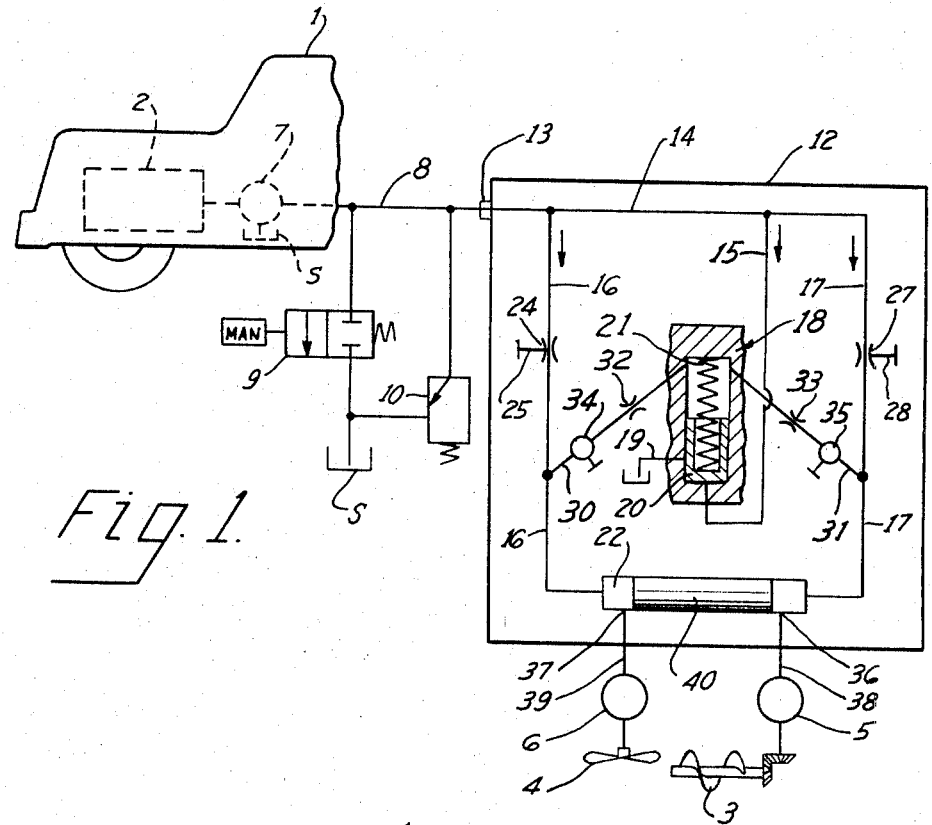
FIG. 1 is a diagram illustrating the invention as applied to a highway salting truck.
Figure 2:
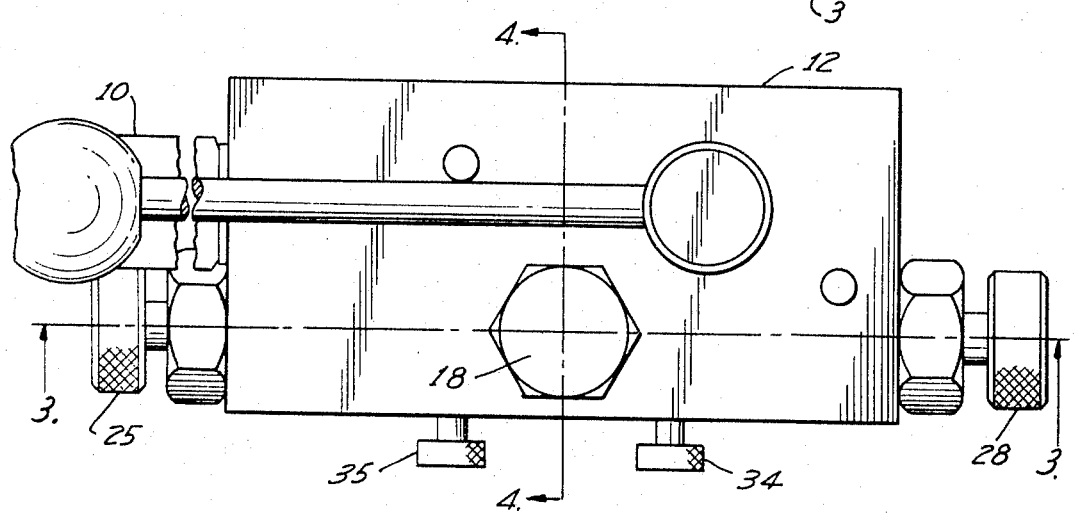
FIG. 2 is a top plan view of a preferred form of valve, embodying the principles of the present invention.
Figure 3:
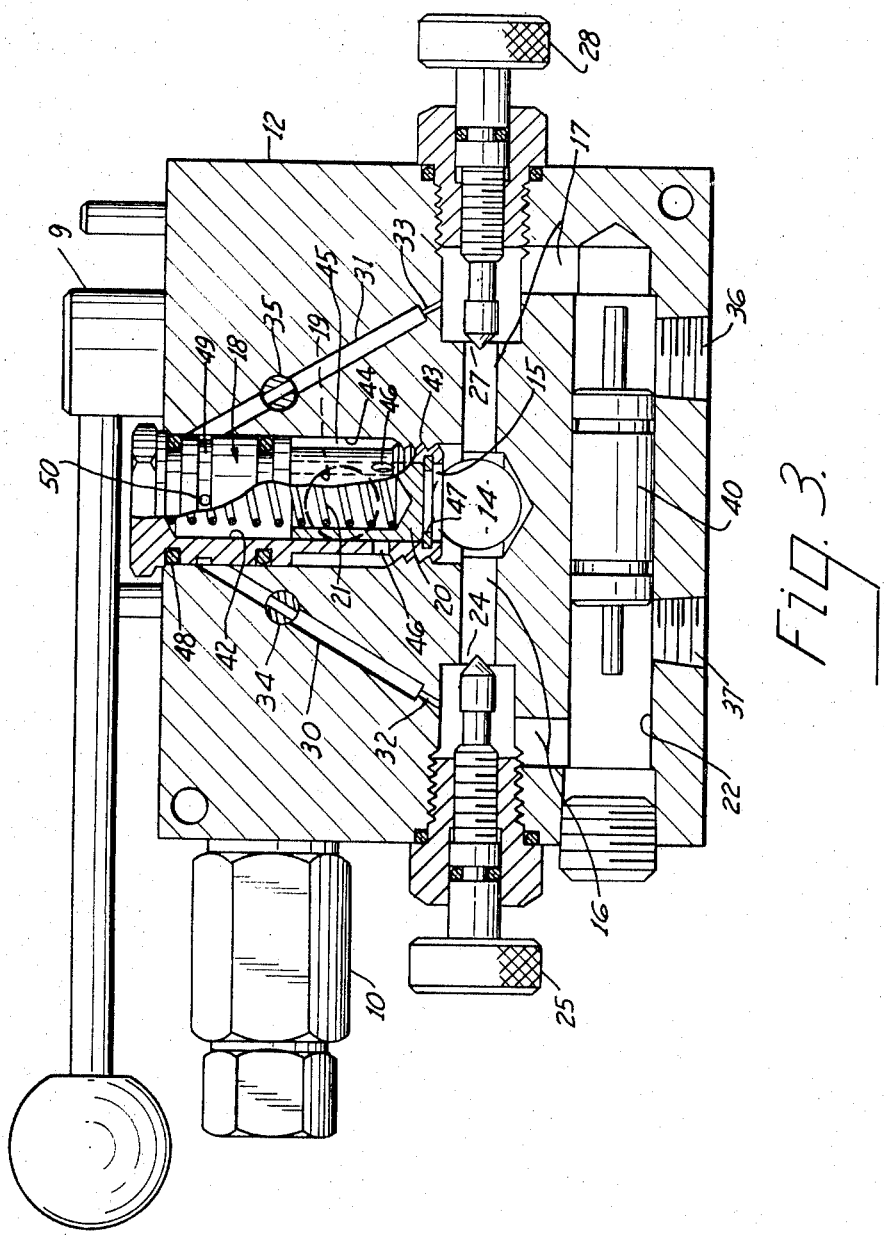
FIG. 3 is a vertical sectional view taken on the line 3—3 of FIG. 2.

Referring specifically to FIG. 1, the valve is shown diagrammatically in connection with a highway salting truck 1 having an engine 2 and provided with a feed auger 3 which feeds the salt to a rotary spreader 4. The auger 3 and spreader 4 are driven by hydraulic motors 5 and 6, respectively. Pressure fluid is supplied to the motors from a pump 7 driven by the engine 2 of the truck. A pressure line 8 connected to the discharge side of the pump 7 supplies the fluid to the inlet of an ON and OFF valve 9 of which the outlet is connected to a tank or sump S, as illustrated. Connected to the line 8 in parallel with the valve 9 is an overload relief valve 10 the discharge side of which is also connected to the sump S.

In order to introduce an effective supply of pressure fluid in the line 8, the valve 9 is closed. To cut off the effective supply of pressure fluid, the valve 9 is opened so as to by-pass the pressure fluid to the sump or tank S.

The structure thus far described is conventional in such installations. The valves 9 and 10 may be a separate installation or incorporated in the body of the present valve, as desired.

The valve of the present invention comprises a single body 12 having suitable ducts and bores for accommodating the various working parts. In the specific form illustrated in FIGS. 1 through 5, employing two pressure compensated regulated output flows from a single pressure fluid input, the body 12 is provided with an inlet port 13 through which pressure fluid is supplied from the line 8. The body has an internal duct 14 connected to the port 13. Branch ducts 15, 16, and 17 are connected in parallel to the duct 14. The branch 15 leads to the head end of a by-pass cylinder 18 having a by-pass duct 19 leading to the sump S. A by-pass spool 20 is reciprocable in the cylinder and is urged yieldably by a spring 21 toward the head end of the cylinder 18 to a restricting position with respect to the duct 19. The spool 20 normally merely restricts communication between the duct 15 and the by-pass duct 19 to varying degrees, but it may fully block this communication if the supply of pressure fluid to the valve inlet is inadequate.

The duct 16 leads to one end of a bore 22 in the body 12. The duct 17 leads to the opposite end of the bore 22. A fluid control orifice 24 is connected by the duct 16 between the duct 14 and one end of the bore 22 for controlling the volume of fluid which may flow to the end of the bore 22 to which duct 16 is connected. The orifice 24 may be of fixed flow type, or, if desired, for greater flexibility in application, may be adjustable by a suitable externally manipulated needle valve 25. Correspondingly, an orifice 27 is connected by the duct 17 between the other end of the bore 22 and the duct 14 for controlling the volume of pressure fluid which may flow to the opposite end of the bore 22. The orifice 27 may be of fixed flow or may be adjustable as to flow by a suitable needle valve 28.

Pressure sensing means are provided for sensing the pressure at the discharge side of either one or both of the orifices 24 and 27, and rendering the sensed pressure operable to control the by-pass spool 20. In the form illustrated, a preferred sensing means is shown and comprises two ducts 30 and 31 connected to the ducts 16 and 17, respectively, at the discharge sides of the associated orifices 24 and 27. The ducts 30 and 31 have minute orifices 32 and 33, respectively, at their outlets, which connect them to the cylinder 18 at the spring side of the spool 20. The orifices 32 and 33 are small enough so that the flow therethrough provides a damping effect.

Suitable stopcocks 34 and 35 may be provided in the ducts 30 and 31, respectively, for closing off either duct selectively, or for fully opening both ducts 30 and 31, as desired. Since the ducts 30 and 31 are thus in communication with the cylinder 18 at the spring side of the spool 20, the pressure at the discharge sides of the orifices 24 and 27 is effective to supplement the spring 21 in urging the spool 20 to extended or resealing position with respect to the by-pass duct 19 against the force of the line pressure in duct 15. The ducts 30 and 31 with their orifices 32 and 33, respectively, together with the duct 15, provide one sensing means for sensing any change in the pressure differential across the orifices 24 and 27.

The differential in pressure between duct 14 and ducts 16 and 17 at the outlet sides of the orifices 24 and 27, respectively, represents the predetermined pressure drop across control orifices 24 and 27. This predetermined differential in pressure is maintained constant by the bypass spool 20. Should this pressure differential exceed the predetermined value, due, for example, to the pressure becoming too low at the outlets of the orifices 24 and 27, the by-pass spool 20 is driven to a retracted position against the force of the spring 21 by the pressure differential and thereby reduces the restriction of flow to the duct 19 which reduces the pressure differential to the predetermined value. Should this pressure differential diminish below the predetermined value, for example, by the pressure becoming too high at the outlets of the orifices 24 and 27, spool 20 will be driven to an extended position by the spring 21 against the pressure differential, thereby increasing the restriction of flow to the duct 19 and raising the pressure differential to the predetermined value.

The opposite ends of the bore 22 are connected to outlet ports 36 and 37, respectively. The ports 36 and 37 are connected by lines 38 and 39 to the hydraulic motors 5 of the auger 3 and the hydraulic motor 6 of the spreader 4.

Mounted for reciprocation in the bore 22 between the ports 36 and 37 is a pressure equalizing spool 40. The purpose of equalizing spool 40 is to maintain the pressures in ducts 16 and 17, at the outlet sides of the orifices 24 and 27, equal to each other regardless of the outlet pressures at the ports 36 and 37. For this purpose the spool 40 is preferably of such a length relative to the bore 22 that when the spool is centered axially therein, pressure fluid can flow readily from the duct 16 to the port 37 past one end of the spool 40 and from the duct 17 to the port 36 past the other end of the spool 40. The ports 37 and 36 are arranged with respect to bore 22 and spool 40 so that spool 40 is responsive only to the pressures in ducts 16 and 17 and so that spool 40 can restrict the flow to either port 37 or 36 as required. Upon occurrence of any differential in pressures between ducts 16 and 17, at the outlet sides of the orifices 24 and 27, respectively, the spool 40 is driven axially by the differential pressure toward the lower pressure end of the bore 22 and restricts the flow to that one of the ports 37 or 36 which is at that end, and thereby restores equal pressures in ducts 16 and 17.

The orifices 24 and 27 are selected or adjusted to supply the desired flows of fluid to the opposite ends of the pistons, respectively, and also to the ports 37 and 36, respectively.

The equalizer spool 40 keeps the outlet pressures of the orifices 24 and 27 equal regardless of the loads on the outlet ports 37 and 36 and regardless of the flows through such ports. The by-pass spool 20 keeps the differential pressure across each of the orifices 24 and 27 constant regardless of the loads and flows so long as the fluid supply is adèquate.

Therefore, as a result of the cooperation of the equalizer spool 40, the by-pass spool 20, the orifices 24 and 27, and the ports 36 and 37, each orifice directly determines the flow through it to its associated outlet port.

In operation, assuming that the pump 7 is supplying fluid to the duct 14 in adequate volume for both loads, the pressure fluid flows through both orifices 24 and 27 to the ports 37 and 36, respectively. The fluid at supply pressure is supplied concurrently to the open end of the cylinder 18, and any excess fluid is by-passed to the sump through the duct 19.

During normal operation, therefore, the selected flows of pressure fluid are supplied to the motors 5 and 6, respectively. Should either load increase or decrease in pressure or should the supply flow increase or decrease in volume, the equalizer spool 40 will move to maintain equal pressures at the discharge sides of the orifices 24 and 27, and concurrently the by-pass spool 20 will move to maintain the predetermined differential pressure across orifices 24 and 27, thereby maintaining both regulated flows at their selected rates.

If, due to reduction of either load, the external pressure at its port 36 or 37, as the case may be, is reduced, the flow through the port to the reduced load starts to increase and increases the drop across the associated one of the orifices 24 or 27. Thereupon the spool 40 is moved by the imbalance of pressures at its opposite ends so as to restrict the port supplying the reduced load until the pressures at opposite ends of the bore 22 are again equal, and remains in the pressure balancing position. Concurrently, the by-pass spool 20 retracts sufficiently to decrease the restriction of the excess flow to the sump so as to restore the predetermined pressure differential across the orifices 24 and 27 and opens the by-pass thereby maintaining the regulated flows constant.

If the supplied flow drops below an adequate volume of fluid, the flow passing through the orifices 24 and 27 is reduced and causes a reduction in the pressure differential across the orifices 24 and 27 so that the force of the spring 21 moves the spool 20 to its fully extended position and stops the by-pass of fluid to the sump. The orifices 24 and 27, in cooperation with the equalizing spool 40, then prorate the inadequate total volume of fluid to the ports 37 and 36. This slows down both motors 5 and 6 in proportion.

If either motor 5 or 6 is slowed by excessive external loads, the pressure in the duct 16 or 17 supplying the slowed motor increases and drives the spool 40 to a position wherein the other motor is slowed proportionately, and excess fluid is relieved through the relief valve 10. If either motor is completely stalled by excessive external loads, the spool 40 stops the flow to the other motor and all supply flow is relieved by the relief valve 10.

If both ducts 30 and 31 are provided and are open, closing of orifice 24 by the needle valve 25 stops the motor 6, and the spool 40 leaves the port 36 open so that the motor 5 continues to operate.

Conversely, closing of the orifice 27 by the needle 28, stops the motor 5 and leaves the port 37 open so that the motor 6 continues to operate.

If the sensing duct 30 is closed by the stopcock 34, or no duct 30 is provided, then the adjustment of the orifice 27 to a closed position will stop the motor 5, and the spool 20 will by-pass all the supply flow to the sump, thus also stopping the motor 6. If instead the orifice 24 is closed while the orifice 30 is closed, the motor 6 will stop and the motor 5 will continue its normal controlled operation. The reverse will occur under like conditions if the duct 31 is closed or omitted and the duct 30 is left open.

If both sensing ducts 30 and 31 are closed, the spool 20 is forced by the pressure in duct 15 to open the by-pass 19 to a degree such that all of the supply flow is by-passed to the sump, thereby stopping both motors 5 and 6.

For convenience in manufacture, the body 12 may be a solid block of metal and the various ducts and orifices may be formed therein by drilling and reaming and the like. The cylinder 18, spool 20, and spring 21 may be a sub-assembly which can be inserted readily as a unit into a bore in the body. For example, the cylinder 18 may be in the form of a plug having an axial bore 42 open at one end only of the cylinder. The cylinder 18 is externally threaded at the open end of the bore for cooperation with companion internal threads, as indicated at 43, in a bore 44 in the body. The cylinder 18 has an integral hex-head at its other end for facilitating its installation in the bore 44. Near its inner end, the cylinder has a portion of reduced external diameter which, when the cylinder is installed, forms with the wall of the bore 44 an annular fluid discharge channel 45. Apertures 46 are provided in the cylinder wall and provide communication between the channel 45 and interior of the cylinder.

A snap ring 47 is engaged in a groove in the cylinder and limits the movement of the spool 20 in a fully extended position.

The apertures 46 are positioned axially of the cylinder 18 so that they can be blocked by the spool 20 when the spool is moved a predetermined distance toward fully extended position.

The open end of the cylinder 18 is connected to the duct 15 and the channel 45 is connected to the by-pass duct 19 which leads to the tank or sump S.

Near its end, the cylinder 18 is sealed in the bore 44 by axially spaced O-ring seals 48. At a location between the seals the cylinder 18 is provided with an exterior annular channel 49 and a radial passage 50 which connects the channel 49 with the interior of the cylinder. Each of the ducts 30 and 31 is connected at one end to the channel 49 so as to provide communication between the bore 42 at the spring side of the spool 20 and the ducts 16 and 17 at the discharge side of the orifices 24 and 27.

The valve shown for purposes of illustration in FIGS. 1 through 4 supplies two pressure compensated regulated flows. In some instances, more than two pressure compensated regulated flows are desired, and such are readily obtainable with valves embodying the principles of the present invention.

As examples, FIGS. 5 and 6 illustrate schematically, the provision of three and four pressure compensated regulated flows from a single pressure source, respectively.

Referring first to FIG. 5, a valve as described in FIGS. 1 through 4 is shown, the corresponding parts being designated by like numerals as in FIGS. 1 and 4 but with a suffix $a$, employing a by-pass duct 19$a$, a spool 20$a$, orifices 24$a$ and 27$a$ in ducts 16$a$ and 17$a$, and ducts 30$a$ and 31$a$ with orifices 32$a$ and 33$a$. An equalizing spool 40$a$ is reciprocable in the bore 22$a$ from which lead outlet ducts 38$a$ and 39$a$ having inlets 36$a$ and 37$a$.

However, this valve is modified by the addition of a supply duct 52 having a flow regulating orifice 53 which discharges to one end of an equalizing bore 54 in which operates an equalizing spool 55. The duct 38$a$ is connected to the other end of the bore 54. The bore 54 has outlets 56 and 57 at its opposite ends from which lead ducts 58 and 59, respectively, the duct 58 leading to a load.

A sensing duct 60 having an orifice 61 and stopcock 62 connect the duct 52, at the discharge side of the orifice 53 with the cylinder bore 42$a$.

The duct 59 leads to one end of another equalizing bore 63 in which operates an equalizing spool 64. The duct 39$a$ leads to the opposite end of the bore 63.

The bore 63 has outlets 65 and 66 which connect with ducts 67 and 68, respectively, which, in turn, lead to different loads. Thus three pressure compensated regulated flows are provided through the ducts 58, 66, and 67, respectively.

If four such flows are provided, the modification of FIG. 6 may be employed, wherein parts corresponding to the parts in FIGS. 1 through 4 are designated by like numerals as in FIGS. 1 through 4 but with suffixes $b$.

In FIG. 6, the single by-pass duct 19$b$ and spool 20$b$ are employed. The regulated flow from the orifices 24$b$ and 27$b$, instead of passing to opposite ends of an equalizing spool, pass to separate equalizers. Thus, the duct 16$b$ leads to one end of an equalizing bore 70 in which an equalizing spool 71 is operable. The duct 17$b$ leads to one end of a bore 72 in which an equalizing spool 73 is operable.

A duct 74 leads from the duct 14$b$ and through a flow regulating orifice 75 to the opposite end of the bore 70. A sensing duct 76 connects the duct 74, at the discharge side of the orifice 75, to the by-pass cylinder bore 42$b$ at the spring side of the by-pass spool 20b through an orifice 77 and a stopcock 78.

Correspondingly a duct 80 leads from the duct 14b and through a flow regulating orifice 81 to the opposite end of the bore 72. A sensing duct 82 connects the duct 80, at the discharge side of the orifice 81 to the by-pass cylinder bore 42b at the spring side of the spool 20b through an orifice 83 and stopcock 84.

A third equalizing bore 85 and spool 86 is provided and is connected at its opposite ends by ducts 87 and 88 to those ends of the bore 70 and 72, respectively, to which the ducts 16b and 17b are connected, so that the pressure supplied to the ducts 87 and 88 from the bores 70 and 72 has been compensated by the equalizing spools 71 and 73, respectively.

The opposite ends of the bore 85 are connected to different loads by ducts 89 and 90, respectively.

The end of the bore 70 connected to the duct 74 is connected to an outlet duct 91, the end of the bore 72 connected to the duct 80 is connected to an outlet duct 92. The ducts 91 and 92 lead to opposite ends, respectively, of an equalizing bore 93 in which an equalizing spool 94 is operable. Discharge ducts 95 and 96 lead from opposite ends of the bore 93, respectively, to different loads. Thus four separate loads can be supplied through discharge ducts 89, 90, 95, and 96, respectively, each load at a pressure compensated regulated flow different from that of the others.

In each instance, the equalizing spool cooperates with the inlets to the outlet ducts at its opposite ends in the same manner as the spool 40 cooperates with the ducts 16 and 17 leading to the outlet ports 37 and 36.

From the foregoing it is apparent that the valve can be modified for dividing a single input flow into any desired number of pressure compensated regulated output flows, each different in pressure and volume from the others, and only one by-pass spool 20 is necessary for all of the equalizing spools.

Having thus described my invention, I claim:

1. A valve device comprising inlet means for receiving pressure fluid;
   orifice means having two regulating orifices connected in parallel to the inlet means;
   outlet means having two discharge ports connected to the discharge sides of the orifices, respectively;
   pressure equalizing means operatively connected with the orifices at their discharge sides, and connected with the ports at the inlet sides of the ports, and operative in response to changes in the pressure differential between the orifice discharges to equalize the pressures at said orifice discharges; and
   pressure sensing means arranged to sense pressure differentials across at least one orifice; and
   by-pass means operative in response to the sensed pressure differential to by-pass excess fluid from the inlet means in sufficient amounts to limit said pressure differential to a predetermined value.

2. A valve device according to claim 1 wherein:
   the two regulating orifices are of different flow capacities, respectively.

3. A valve device according to claim 1 wherein the pressure equalizing means includes means having a passage therein connected at one location to the discharge side of one of said orifices in advance of its associated outlet port, and connected at another location, spaced from said one location to the discharge side of the other of said orifices in advance of its associated outlet port;
   movable means is disposed in the passage between said locations and has at least one portion movable in opposite directions, respectively, by differentials in fluid pressure between said locations, toward the location of the lower pressure; and
   the said movable means includes means arranged to progressively restrict the outlet port at the lower pressure location upon movement of said portion by the fluid.

4. A valve device according to claim 3 wherein the passage is a cylindrical bore;
   the movable means is a spool reciprocable axially in the bore;
   the orifices are connected to the opposite ends of the bore, respectively; the outlet ports have their inlets opening into the bore in positions so as to be restricted by the spool as the spool is moved predetermined distances toward the ends of the bore, selectively.

5. A valve device according to claim 1 wherein the by-pass means includes a cylinder connected at one location to the inlet means and having a by-pass port spaced from said location;
   a by-pass spool reciprocable in the cylinder;
   a spring yieldably urging the by-pass spool toward advanced position for causing the spool to restrict the by-pass port;
   means connect the sensing means to the by-pass means so as to apply to the spool force which supplements the force of the spring in urging the spool toward advanced position; and
   said spring is inadequate to hold the spool in advanced position when the force applied by the sensing means drops below a predetermined level due to an increase in the pressure differential across said one of the orifices.

6. A valve device according to claim 5 wherein the sensing means includes a sensing duct connected at one of its ends to the discharge side of said one orifice and connected at the other of its ends to said cylinder at the spring side of the spool therein.

7. A valve device according to claim 1 wherein the sensing means comprises two separate sensing elements connected to the discharge sides of the orifices, respectively, and both sensing elements are connected to the same by-pass means, so as to render the by-pass means operative by the pressure differential at the discharge side of either orifice.

8. A valve device according to claim 7 wherein control means are connected to at least one of the elements to render it operative and inoperative, selectively.

9. A valve device according to claim 1 wherein adjustment means are provided for at least one orifice and are cooperable with the associated one of the orifices to change the effective area thereof.

References Cited

UNITED STATES PATENTS

| 1,993,790 | 3/1935 | Kinsella | 137—101 XR |
| 2,956,577 | 10/1960 | Kirkham | 137—101 |
| 3,330,531 | 7/1967 | Slator | 137—101 XR |

HAROLD W. WEAKLEY, *Primary Examiner.*

U.S. Cl. X.R.

137—117